F. W. SMITH & R. E. GEARHART.
PLASTIC BRICK MACHINE.
APPLICATION FILED JUNE 24, 1914.

1,165,632.

Patented Dec. 28, 1915.
3 SHEETS—SHEET 1.

WITNESSES:

INVENTORS
F. W. SMITH AND
R. E. GEARHART
BY
ATTORNEY

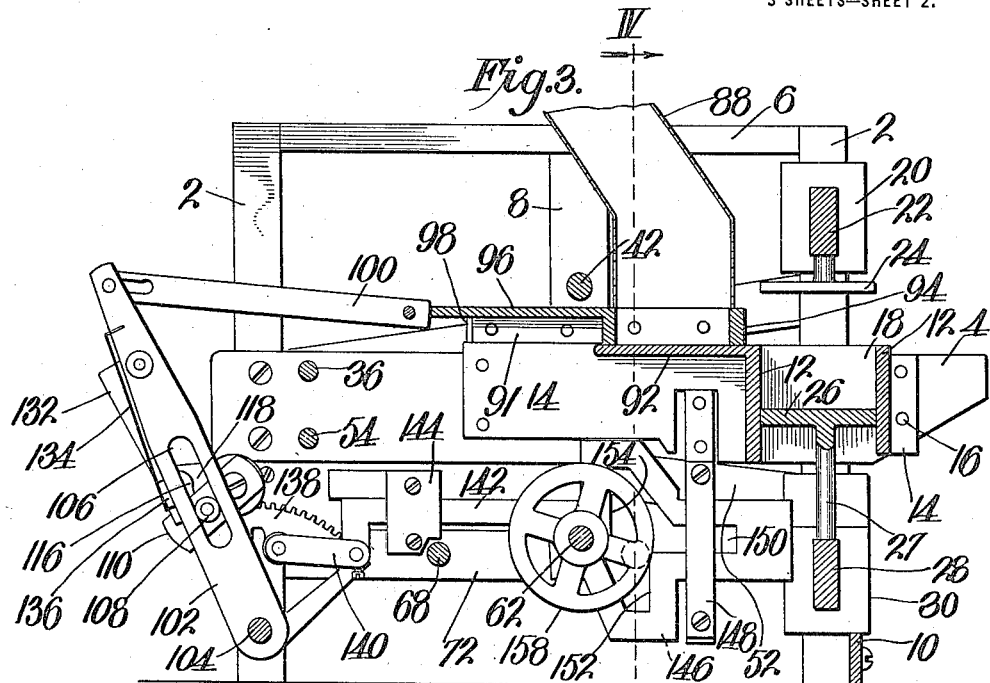
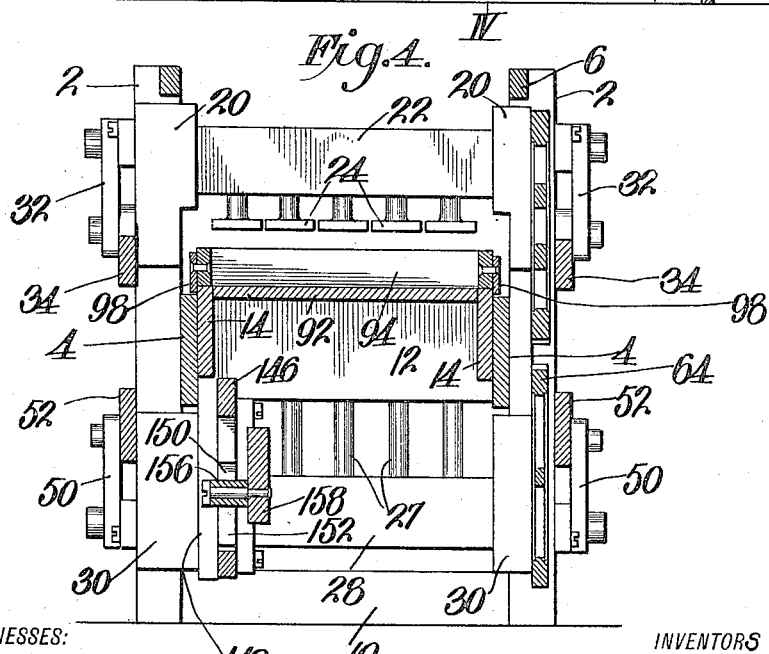

F. W. SMITH & R. E. GEARHART.
PLASTIC BRICK MACHINE.
APPLICATION FILED JUNE 24, 1914.
1,165,632.
Patented Dec. 28, 1915.
3 SHEETS—SHEET 3.
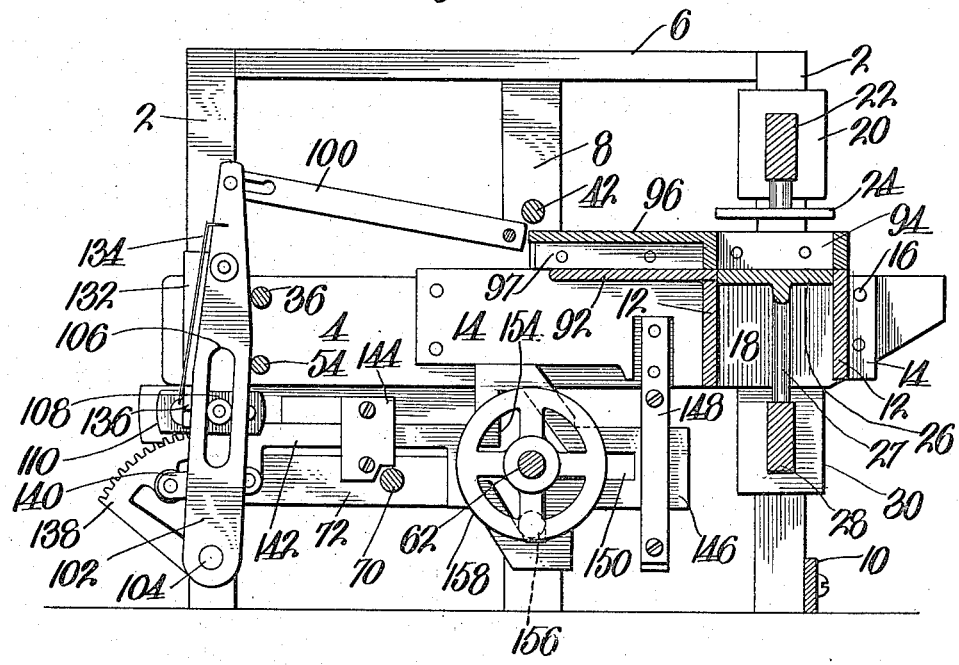
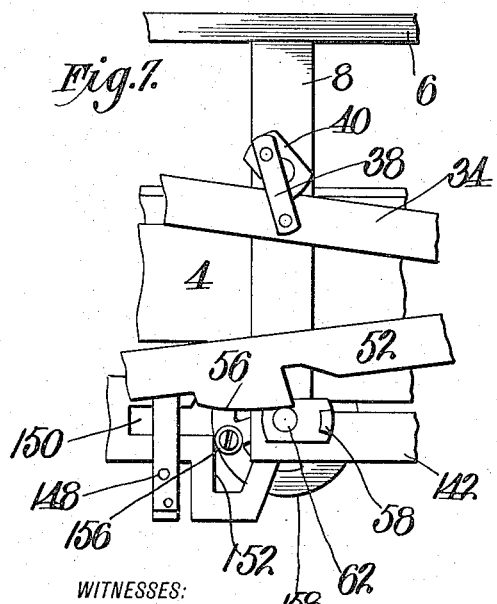
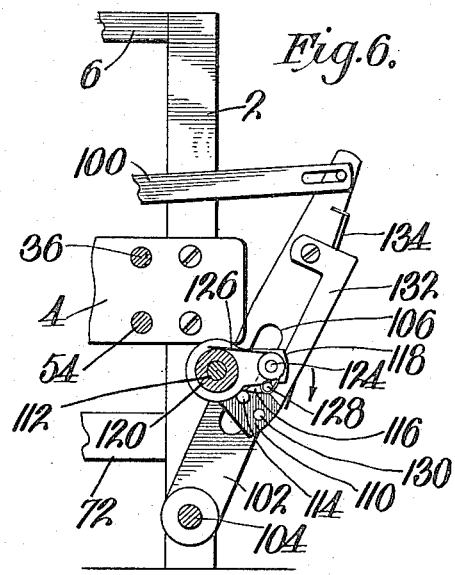
WITNESSES:
Frank R. Gore
H. E. Rodgers.
INVENTORS
F. W. SMITH AND
R. E. GEARHART
BY George H. Hooper
ATTORNEY

UNITED STATES PATENT OFFICE.

FREDERICK W. SMITH AND ROY E. GEARHART, OF MARYVILLE, MISSOURI; SAID GEARHART ASSIGNOR TO SAID SMITH.

PLASTIC-BRICK MACHINE.

1,165,632.  Specification of Letters Patent.  Patented Dec. 28, 1915.

Application filed June 24, 1914. Serial No. 846,982.

*To all whom it may concern:*

Be it known that we, FREDERICK W. SMITH and ROY E. GEARHART, citizens of the United States, residing at Maryville, in the county of Nodaway and State of Missouri, have invented certain new and useful Improvements in Plastic-Brick Machines, of which the following is a specification.

This invention relates to molding machines, with particular reference to machines for making bricks and the like, though certain characteristics of the invention as hereinafter described may be employed to advantage in connection with machinery for the molding of plastic materials in general. For this purpose the invention aims to produce a machine by which the manufacture of molded articles may be carried out accurately and expeditiously, and in which the movement of the machine parts is so planned and the cycle of operation so contrived as to consume a minimum of power.

Having the above-stated general object in view, the invention will now be described in connection with the accompanying drawings showing one form of means which has been devised for carrying the invention into practice; after which those features deemed to be novel will be severally specified in the appended claims.

Figure 1:
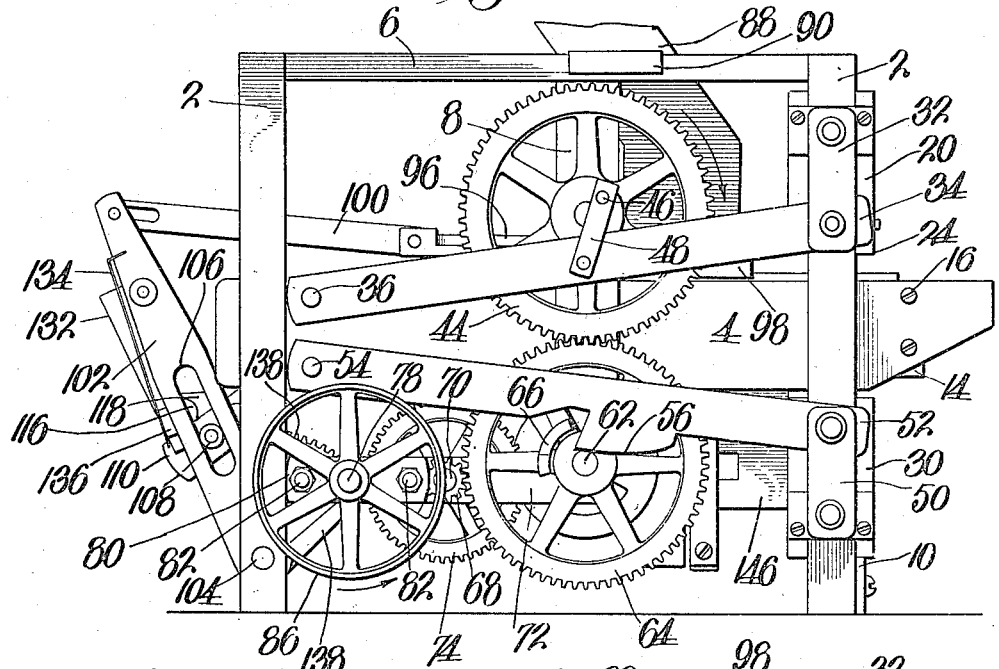
Figure 2:
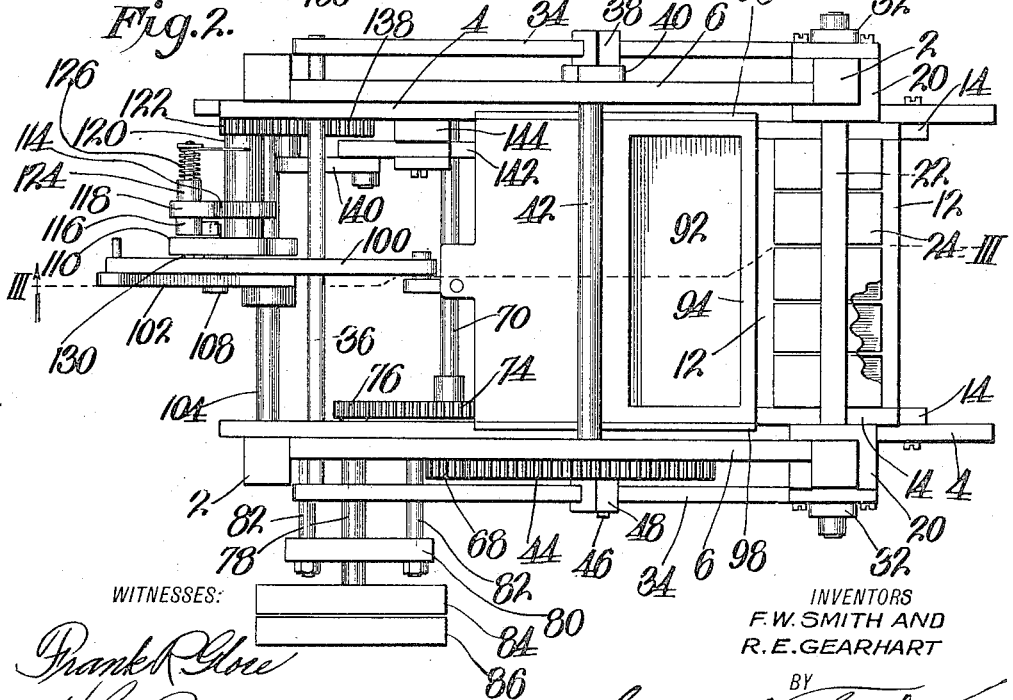

In the drawings—Figure 1 is a side elevation of a machine embodying the invention, with the parts shown in the position occupied thereby just prior to a molding operation; Fig. 2 is a plan view of the same, with the hopper removed and with certain parts broken away; Fig. 3 is a central longitudinal vertical section taken on the line III—III of Fig. 2, and with hopper in position; Fig. 4 is a vertical transverse section taken on the line IV—IV of Fig. 3; Fig. 5 is a view similar to Fig. 3 but with the parts shown in a different working relation; i. e., in material feeding position; Fig. 6 is a fragmentary view of a portion of the mechanism for operating the material feeding device, the parts of said mechanism being shown in the same position as illustrated in Fig. 1, but locking in the opposite direction; and Fig. 7 is a fragmentary elevation showing a portion of one of the pairs of die-operating levers and their drive connections.

Referring to the drawings, the frame of the machine comprises the corner uprights 2 which are joined by the main longitudinally extending side plates 4, and also by the top connecting rails 6, said plates and rails being joined at their mid-points by the vertical bars 8. The uprights 2 at the front of the machine (i. e., at the right in Fig. 1) are further joined by a foot-plate 10, which also serves as a stop for limiting the movement of certain parts hereinafter referred to.

Between the front uprights 2, the side plates 4 carry a matrix or mold made up of transverse plates 12 held in place by longitudinally extending plates 14, which are secured by bolts 16 to the side plates 4. The mold is divided into a series of matrices or mold compartments by means of the partitions 18 carried by the plates 12. These compartments are, in horizontal section, of a size corresponding to the length and breadth of the article to be molded.

The upper and lower portions of the front uprights 2 serve as guideways for the male die members which coöperate with the matrices or mold compartments. A pair of slides 20 is mounted upon the upper portions of said uprights, and these slides are connected by a transverse bar 22 which carries a gang of male dies or conforming members 24 adapted to reciprocate into and out of the mold compartments from the position indicated in Figs. 3 and 4. A second gang of male die members or plungers 26 is carried by the posts 27 on a transverse bar 28 which connects a pair of slides 30 mounted on the lower portions of the front uprights. The die members 26 reciprocate always within the matrices or mold compartments, moving from their lowermost position, as illustrated in Fig. 3, to a position in which their upper faces lie flush with the upper edges of the plates 12, as shown in Fig. 5. The die members 26 move into molding position, i. e., the lower position shown in Fig. 3, under the influence of gravity on said members and their connected parts, and come to rest by the engagement of the slides 30 with the foot-plate 10.

The two gangs of die members are operated by the following mechanism. The upper slides 20 are connected by the links 32 to the front ends of a pair of levers 34, the rear ends of which are connected to the outer ends of a transverse shaft 36 journaled in the side plates 4. Intermediate its ends one of the levers 34 is connected by a link 38 to a crank 40 on one end of a shaft 42 journaled in the vertical bars 8, the other end of which shaft 42 has fixed thereto a gear wheel 44 provided with the wrist-pin 46 having the link connection 48 with the other lever 34. The lower slides 30 are connected by the links 50 with the front ends of a pair of levers 52, the rear ends of which are connected to the outer ends of a transverse shaft 54 journaled in the side plates 4 just below the shaft 42. Intermediate its ends each of the levers 52 is provided with a depending cam portion 56, one of which is adapted to be engaged by a cam lug 58 carried by a crank 60 on one end of a shaft 62 which is journaled in the lower ends of the vertical bars 8. To the other end of the shaft 62 is fixed a gear wheel 64 meshing with the wheel 44 and provided with a cam lug 66 designed to engage the cam portion 56 of the other lever 52. These cam lugs 58 and 66 are so arranged and operated as to come into engagement with the cam portions 56 and lift the levers 52 each time the levers 34 are lifted, and then release said levers 52 after the levers 34 have reached their highest position. The gear wheel 64 is driven from a pinion 68 fixed to a shaft 70 journaled in side plates 72 which are supported at their opposite ends by the vertical bars 8 and the rear uprights 2. The shaft 70 also carries a gear wheel 74 meshing with a pinion 76 fixed on the inner end of a power shaft 78 which is journaled in a frame comprising one of the side plates 72 and a short plate 80 connected thereto by the spacing bars 82. On the outer end of the shaft 78 are the tight and loose pulleys 84 and 86, respectively, for the application of power, which is transmitted to the levers 52 and 34 by the reducing gearing just described.

The material (not shown) for the action of the molding mechanism is fed intermittently from a hopper (see Figs. 1 and 3), which is provided with the lateral retaining flanges 90 for engagement with the top rails 6, whereby the hopper is maintained in proper position over a table 92 extending transversely immediately at the rear of the mold. This table is supported at its opposite ends by the plates 14 with its top face flush with the top edge of the mold. The lower edge or mouth of the hopper 88 is spaced sufficiently above the table 92 to provide just room enough for a reciprocating feeding member comprising a skeleton frame 94 of the same size and shape as the upper edge or mouth of the mold, with which said frame is designed to register when in its forward or material-delivering position (see Fig. 5). When in position beneath the mouth of the hopper, the bottom of the hopper is temporarily constituted by the table 92, at which time the frame or feeding member 94 receives a measured charge of the material, which is sheared off from the remainder of the material in the hopper by the movement of the frame horizontally across the mouth of the hopper. During this feeding movement, a second temporary bottom for the hopper is provided in the form of a table extension to the frame 94, extending to the rear of said frame in the plane of the lower edge or mouth of the hopper. The action is in effect a valve action, in which the table extension 96 functions as a valve allowing an intermittent discharge of the hopper material for each rearward movement of the feeding member. The sides of the table 96 have downturned flanges 97 (see Figs. 3 and 5) adapted to ride upon the rear portions of the plates 14, and said table and the feed member are provided with keeper plates 98 embracing the outer sides of said plates 14 and acting to maintain the table 96 and feeding device in proper alinement over the table 92 and the mold.

The operation and proper timing of the feeding mechanism is effected as follows: The rear end of the table 96 is pivotally connected to a link 100 having a pivot and slot connection with the upper end of an oscillating lever 102 pivoted on a rock shaft 104 journaled in the lower ends of the rear uprights 2. This lever is provided with a slot 106 for receiving a roller 108 carried by a pawl-operated crank arm 110 on the stub-shaft 112 projecting inward from the rear end of one of the side plates 4. From one side of the crank arm 110 projects a pin 114 for engagement with a pawl 116 carried by an arm 118 on one end of a sleeve 120, also journaled on the shaft 112 and provided at its other end with a pinion 122. The arm 118 which carries the pawl is provided with a laterally projecting pin 124 around which is coiled a spring 126 having one of its ends bearing against the sleeve 120 and its other end against a pin 128 projecting laterally from the pawl, thereby tending to hold the latter pressed normally inward toward the axis of the sleeve with the pin 128 resting against the arm 118. In this position the pawl, when moving in the direction of the arrow in Fig. 6, will engage the pin 114 for moving the latter in the same direction and effecting oscillation of the lever 102; but, in moving in the opposite direction, the pawl simply rides idly over said pin, and in order to insure that this reverse movement of the pawl will not effect like movement of the crank arm, the latter is provided with a pin 130 projecting in the direction of the lever 102 in position to engage a detent 132 pivoted to said lever and held yieldingly in the path of said pin by a spring 134. In operative movement of the crank arm 118, the pin 130 engages the detent and forces the same out of its path, the detent returning to original position behind the pin and its returning movement being limited by a stop lug 136 engaging the lever 102.

The pinion 122 meshes with a gear segment 138 carried by the shaft 104, to which gear segment is pivoted one end of a link 140, the other end of which is pivotally connected to the rear end of a sliding bar 142. This bar 142 is slidingly mounted in a guide bracket 144 and its forward end is equipped with a slotted crosshead 146, the front portion of which operates slidingly in a guide bracket 148. The crosshead 146 is provided with a longitudinal slot opening 150 for accommodating the adjacent end of the shaft 62, and with a vertical slot opening having the vertical edges 152 and 154 for working engagement with a roller 156 provided on one face of a wheel 158 fixed to the shaft 62, whereby the crosshead and slide bar 142 may be positively reciprocated in either direction.

The operation of the machine will now be briefly summarized.

With the parts as shown in Fig. 1, the material from the hopper is received in the skeleton feeding member 94. Power being applied to the machine (and assuming that there is already a charge of material in the mold), the levers 34 are lowered, bringing the gang of dies 24 into the matrices or mold compartments and tightly upon the material therein, thereby conforming the material to the matrices, the dies 26 being at this time supported by means of the slides 20 upon the foot plate 10. Continued operation of the machine first acts to raise slightly the dies 24 and thus separate the dies 24 and 26 slightly farther apart in order to facilitate ejection of the molded blocks when withdrawn from the mold; then the cam lugs 58 and 66 engage the cams on the levers 52, so that the dies 24 and 26 are now raised in unison to the position shown in Fig. 3. In the meantime the roller 156 has moved along the slot edge 152 of the crosshead 146, actuating the slide bar 142 to the rear and causing reverse movement of the pawl 116 into operative engagement with the pin 114. The roller 156 is now ready to operate along the slot edge 154 of said crosshead while the lugs 58 and 66 continue in engagement with the cams of levers 52. This results in the dies 26 remaining stationary while the lever 102 is oscillated forward to bring the feeding member in between the dies and over the mold,—the upper dies 24 also remaining practically stationary during the same interval due to the links 38 and 48 passing the center of the shaft 42. Obviously this movement of the feeding member at the same time ejects the molded blocks from between the dies, and upon a pallet at the front of the machine, or they may be received in any suitable receptacle presented between the front ends of the side plates 4. This same movement of the feeding member brings a fresh supply of the material in place over the mouth of the mold, and before the feeding member recedes the levers 52 are tripped by the lugs 58 and 66 passing from beneath the cams 56, thus allowing the dies 26 to drop back into lowered position, which tends to create a suctional action within the matrices whereby the material is drawn into the matrices through the combined action of gravity and suction. The continued movement of the roller 156 along the slot edge 154 of the crosshead oscillates the lever 102 backward and thereby returns the feeding member into initial position, leaving the parts now all in their original position, and the further operation of the machine is a mere repetition of that already outlined.

It will thus be seen that an efficient apparatus has been devised for carrying out the objects of the invention, a plurality of the molded blocks (in the illustrated machine, five of such blocks) being produced for each and every operation of the machine. The same means which feeds the material to the mold acts simultaneously with the feeding movement to eject the molded material. Further effectiveness is gained in the feeding operation by the arrangement which obtains the combined action of gravity and suction for accelerating the discharge of the material into the mold. Moreover, an economy is arrived at in the consumption of power by so planning the cycle of the machine that the first step of the molding operation takes place under gravity, and thereafter the molding operation is completed by a downward movement of the upper dies facilitated by gravity.

While the foregoing represents what is now conceived to be the preferred form of embodiment of the invention, the right is reserved to such formal changes and modifications as may fairly fall within the scope of the appended claims.

Claims:

1. In a molding machine, a matrix, co-operating upper and lower plungers for making brick within the matrix, a driven shaft, means for transmitting power from the said shaft to operate said plungers, a wheel on said shaft provided with a wrist-pin, a bar provided with a cross-shaped opening having diagonally opposite sides for alternate engagement by the wrist-pin whereby to reciprocate said bar, means for holding a charge of brick-making material, and means whereby rearward movement of the said bar shall cause said charge holding means to move forward over the matrix between the plunger when elevated and forward movement of said bar shall effect rearward movement of said charge holding means.

2. In a molding machine, a matrix, coöperating upper and lower plungers for making brick within the matrix, a driven shaft, means for transmitting power from the said shaft to operate said plungers, a wheel on said shaft provided with a wrist-pin, a bar provided with a cross-shaped opening having diagonally opposite sides for alternate engagement by the wrist-pin whereby to reciprocate said bar, means for holding a charge of brick-making material, an oscillatory lever linked to said charge-holding means, rotatable means to operate said lever, and means for transmitting power from said bar to said rotatable means to operate the same.

3. In a molding machine, the combination of a die, coöperating male members for forming a brick in said die, a driven shaft, means actuated by said shaft to effect the operation of said members, a reciprocatory device for supplying molding material to said die between the die members, an oscillatory lever connected to reciprocate said device, a segment connected to be oscillated from said shaft, a pinion meshing with and adapted for rotation alternately in opposite directions by said segment, a crank arm rotatable with said pinion, a spring actuated pawl carried by said crank arm, a second crank arm having a pin and slot connection with said lever and provided with a pin engaged by said pawl whereby the latter in one rotation of the pinion shall likewise rotate said second crank arm and thereby effect oscillation of said lever, and means for preventing back rotation of said second crank arm under the pressure applied thereon by the spring actuated pawl in riding over said pin in the reverse operation of the pawl-carrying crank arm to its initial position.

In testimony whereof, we affix our signatures, in the presence of two witnesses.

FREDERICK W. SMITH.
ROY E. GEARHART.

Witnesses:
H. C. RODGERS,
G. Y. THORPE.

Copies of this patent may be obtained for five cents each, by addressing the "Commissioner of Patents. Washington, D. C."